United States Patent
Fortune et al.

(10) Patent No.: US 9,628,176 B2
(45) Date of Patent: Apr. 18, 2017

(54) HEARING DEVICE WITH OPTICAL RECEIVER

(75) Inventors: Todd William Fortune, Apple Valley, MN (US); René Mortensen, Hvidovre (DK)

(73) Assignee: GN HEARING A/S, Ballerup (DK)

( * ) Notice: Subject to any disclaimer, the term of this patent is extended or adjusted under 35 U.S.C. 154(b) by 1354 days.

(21) Appl. No.: 13/229,656

(22) Filed: Sep. 9, 2011

(65) Prior Publication Data
US 2013/0064552 A1   Mar. 14, 2013

(51) Int. Cl.
| H04R 25/00 | (2006.01) |
| H04B 10/116 | (2013.01) |
| H04R 1/10 | (2006.01) |
| H04R 23/00 | (2006.01) |

(52) U.S. Cl.
CPC ......... *H04B 10/116* (2013.01); *H04R 1/1016* (2013.01); *H04R 23/008* (2013.01); *H04R 25/554* (2013.01); *H04R 2225/021* (2013.01); *H04R 2499/11* (2013.01)

(58) Field of Classification Search
CPC .. H04R 23/008; H04R 1/1008; H04R 1/1016; H04R 25/04; H04R 25/55; H04R 25/554; H04R 25/556; H04R 2225/021; H04R 2225/025; H04R 2499/11; H04R 2499/15; H04B 10/114; H04B 10/1143; H04B 10/675; H04B 10/116
USPC ... 381/312, 315, 322, 326, 328, 330, 72, 74, 381/172, 370, 374, 381; 398/115, 132, 398/133, 134, 127, 130, 135, 212
See application file for complete search history.

(56) References Cited

U.S. PATENT DOCUMENTS

| 6,148,087 A * | 11/2000 | Martin ......................... 381/327 |
| 7,099,589 B1 * | 8/2006 | Hiramatsu ........... H04B 10/114 398/127 |
| 7,639,955 B2 * | 12/2009 | Zheng .................. H04B 10/675 398/212 |

(Continued)

FOREIGN PATENT DOCUMENTS

| DE | 2431937 A1 | 1/1976 |
| EP | 1079550 A1 | 2/2001 |

(Continued)

OTHER PUBLICATIONS

Partial Search Report dated Feb. 28, 2012 for EP Patent Application No. 11183835.5.

(Continued)

*Primary Examiner* — Huyen D Le
(74) *Attorney, Agent, or Firm* — Vista IP Law Group, LLP

(57) ABSTRACT

A hearing system includes a hearing device for wear by a user, the hearing device comprising a speaker, and an optical receiver configured to detect light signals, and generate electrical signals in response to the detected light signals, wherein the speaker of the hearing device is communicatively coupled to the optical receiver, and is configured to provide audio signals based at least in part on the electrical signals. A hearing system includes a hub configured to receive an input from a user of the hub, and generate an output in response to the input, and a light source communicatively coupled to the hub, wherein the light source is configured to provide light signals for reception by a hearing device based at least in part on the output from the hub.

32 Claims, 9 Drawing Sheets

(56) References Cited

U.S. PATENT DOCUMENTS

| | | | | |
|---|---|---|---|---|
| 2002/0030871 A1* | 3/2002 | Anderson et al. | ............ | 359/150 |
| 2003/0142841 A1* | 7/2003 | Wiegand | ........................ | 381/172 |
| 2005/0018859 A1* | 1/2005 | Buchholz | ........................ | 381/74 |
| 2008/0317475 A1* | 12/2008 | Pederson | ........... | H04B 10/1143 |
| | | | | 398/135 |
| 2010/0034409 A1* | 2/2010 | Fay et al. | ...................... | 381/326 |
| 2010/0048982 A1* | 2/2010 | Puria | .................... | H04R 23/008 |
| | | | | 600/25 |

FOREIGN PATENT DOCUMENTS

| | | |
|---|---|---|
| EP | 1 443 686 A1 | 8/2004 |
| JP | 6-140158 A | 5/1994 |
| WO | 01/76059 A2 | 10/2001 |
| WO | 2006/133158 A1 | 12/2006 |
| WO | 2009/155361 A1 | 12/2009 |

OTHER PUBLICATIONS

English Abstract for JP 06 140158 A dated May 20, 1994.
Extended European Search Report dated Jul. 30, 2012 for EP Patent Application No. 11183835.5.
Partial Search Report for EP Patent Application No. 11183835.5.
English Abstract for JP 06 140158 A.

* cited by examiner

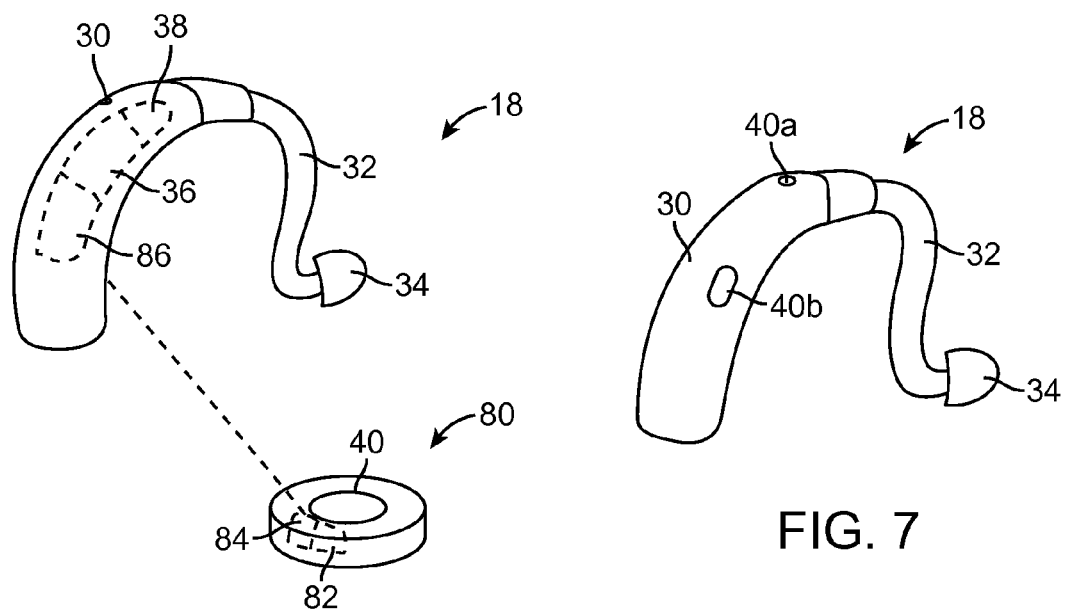
FIG. 6
FIG. 7
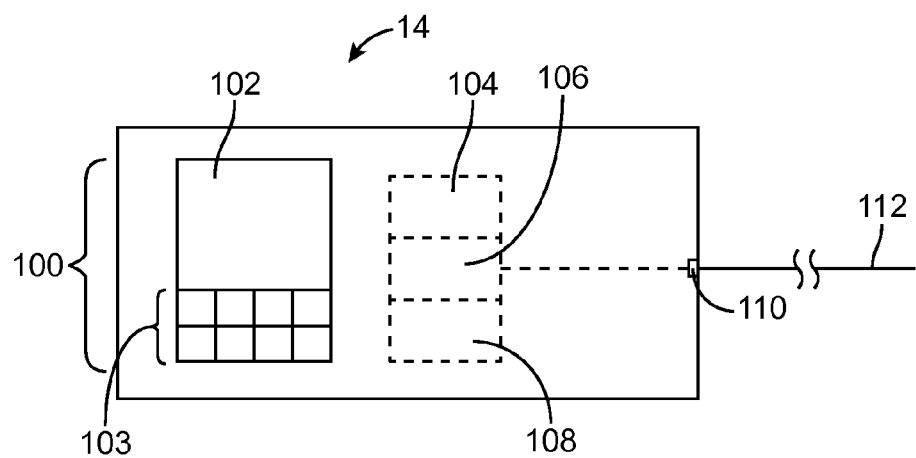
FIG. 8

HEARING DEVICE WITH OPTICAL RECEIVER

FIELD

This application relates generally to hearing devices.

BACKGROUND

Children with certain medical conditions may sometimes be required to wear hearing devices so that they can hear better in a school environment. For example, children with hearing deficiencies may be required to wear hearing aids. Also, normal-hearing children who suffer from concentration-related disorders, such as attention-deficit hyperactivity disorder (ADHD), or auditory processing disorder (APD) may also be required to wearing hearing devices so that they can focus the words of the communicator(s). Hearing devices may also be used by normal-hearing children in noisy environments, such as in a classroom, a playground, a museum, a park, etc., so that they can hear and understand better the words from parent(s) and/or teacher(s).

Existing hearing devices do not have any optical receivers. Applicant of the subject application has determined that it would be desirable to provide hearing devices with optical receivers.

SUMMARY

In accordance with some embodiments, a hearing system includes a hearing device for wear by a user, the hearing device comprising a speaker, and an optical receiver configured to detect light signals, and generate electrical signals in response to the detected light signals, wherein the speaker of the hearing device is communicatively coupled to the optical receiver, and is configured to provide audio signals based at least in part on the electrical signals.

In one or more embodiments, the optical receiver may be configured to detect the light signals at transmission rates higher than that detectable by human eye.

In one or more embodiments, the optical receiver may comprise a photodetector.

In one or more embodiments, the hearing system may further include a filter for filtering the light signals before they are detected by the optical receiver.

In one or more embodiments, the optical receiver may be configured to be sensitive to light in a certain range of wavelengths.

In one or more embodiments, the hearing device may comprise a housing, the speaker may be inside the housing of the hearing device, and the hearing device may further include a sound tube for transmitting the audio signals from the speaker to an ear of the user.

In one or more embodiments, the hearing device may comprise a housing, the speaker may be outside the housing of the hearing device, and the hearing device may further include a flexible electrical conductor coupled between the housing and the speaker.

In one or more embodiments, the hearing device may include a head band.

In one or more embodiments, the optical receiver may be located at the head band.

In one or more embodiments, the optical receiver may be a part of the hearing device.

In one or more embodiments, the hearing system may further include a light source for providing the light signals.

In one or more embodiments, the light source may comprise a light fixture configured for mounting to a room.

In one or more embodiments, the light source may comprise a plurality of LEDs.

In one or more embodiments, the light source may be configured to provide the light signals at transmission rates higher than that detectable by human eye.

In one or more embodiments, the hearing system may further include a hub communicatively coupled to the light source.

In one or more embodiments, the hub may be configured to receive first signals associated with a first sound source.

In one or more embodiments, the hub may be further configured to receive second signals associated with a second sound source, and process the first signals and the second signals for transmission of the first and second signals to the light source in accordance with a predetermined transmission scheme.

In one or more embodiments, the hub may be configured for wear by a person.

In one or more embodiments, the hub may include a user interface for receiving an input, and wherein the light source may be configured to provide the light signals based at least in part on the input.

In one or more embodiments, the input may be for activating a function in the hearing device, setting up the hearing device, programming the hearing device, controlling the hearing device, activating the hearing device, or deactivating the device.

In one or more embodiments, the input may be for controlling a gain of the audio signals provided by the hearing device.

In one or more embodiments, the light signals may be configured to activate a function in the hearing device, setup the hearing device, program the hearing device, control the hearing device, activate the hearing device, or deactivate the device.

In one or more embodiments, the optical receiver may be located on top of the hearing device.

In one or more embodiments, the hearing system may also include a non-optical receiver, wherein the optical receiver is configured to detect the light signals as a control signal for controlling the hearing device, and the non-optical receiver is configured to receive sound signals.

In one or more embodiments, the hearing device may further include an integrated circuit configured to control a function of the hearing device based at least in part on the electrical signals.

In accordance with other embodiments, a hearing system includes a hub configured to receive an input from a user of the hub, and generate an output in response to the input, and a light source communicatively coupled to the hub, wherein the light source is configured to provide light signals for reception by a hearing device based at least in part on the output from the hub.

In one or more embodiments, the input may comprise first signals associated with a first sound source, the first sound source being the user of the hub.

In one or more embodiments, the hub may be further configured to receive second signals associated with a second sound source, and process the first signals and the second signals for transmission of the first and second signals to the light source in accordance with a predetermined transmission scheme.

In one or more embodiments, the hub may be configured for wear by the user of the hub.

In one or more embodiments, the hub may include a user interface for receiving the input.

In one or more embodiments, the input may be for controlling a gain of audio signals provided by the hearing device.

In one or more embodiments, the light source may comprise a light fixture configured for mounting to a room.

In one or more embodiments, the light source may include a plurality of LEDs.

In one or more embodiments, the light source may be configured to provide the light signals at transmission rates higher than that detectable by human eye.

In one or more embodiments, the hearing system may further include the hearing device, the hearing device having a speaker configured to provide audio signals based at least in part on the light signals.

In one or more embodiments, the hearing device may include an optical receiver for detecting the light signals.

In one or more embodiments, the optical receiver may be configured to detect the light signals at transmission rates higher than that detectable by human eye.

In one or more embodiments, the optical receiver may comprise a photodetector.

In one or more embodiments, the hearing system may include a filter for filtering the light signals before they are detected by the optical receiver.

In one or more embodiments, the optical receiver may be configured to be sensitive to light in a certain range of wavelengths.

In one or more embodiments, the hearing device may comprise a housing, the speaker may be inside the housing of the hearing device, and the hearing device may further include a sound tube for transmitting the audio signals from the speaker to an ear of a wearer of the hearing device.

In one or more embodiments, the hearing device may comprise a housing, the speaker may be outside the housing of the hearing device, and the hearing device may further include a flexible electrical conductor coupled between the housing and the speaker.

In one or more embodiments, the hearing device may include a head band.

In one or more embodiments, the optical receiver may be located at the head band.

In one or more embodiments, the light signals may be configured to activate a function in the hearing device, setup the hearing device, program the hearing device, control the hearing device, activate the hearing device, or deactivate the device.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

FIG. 6 illustrates a hearing device in accordance with other embodiments.

FIG. 7 illustrates a hearing device in accordance with other embodiments.

FIG. 8 illustrates a hub in accordance with some embodiments.

DESCRIPTION OF THE EMBODIMENTS

Figure 1:
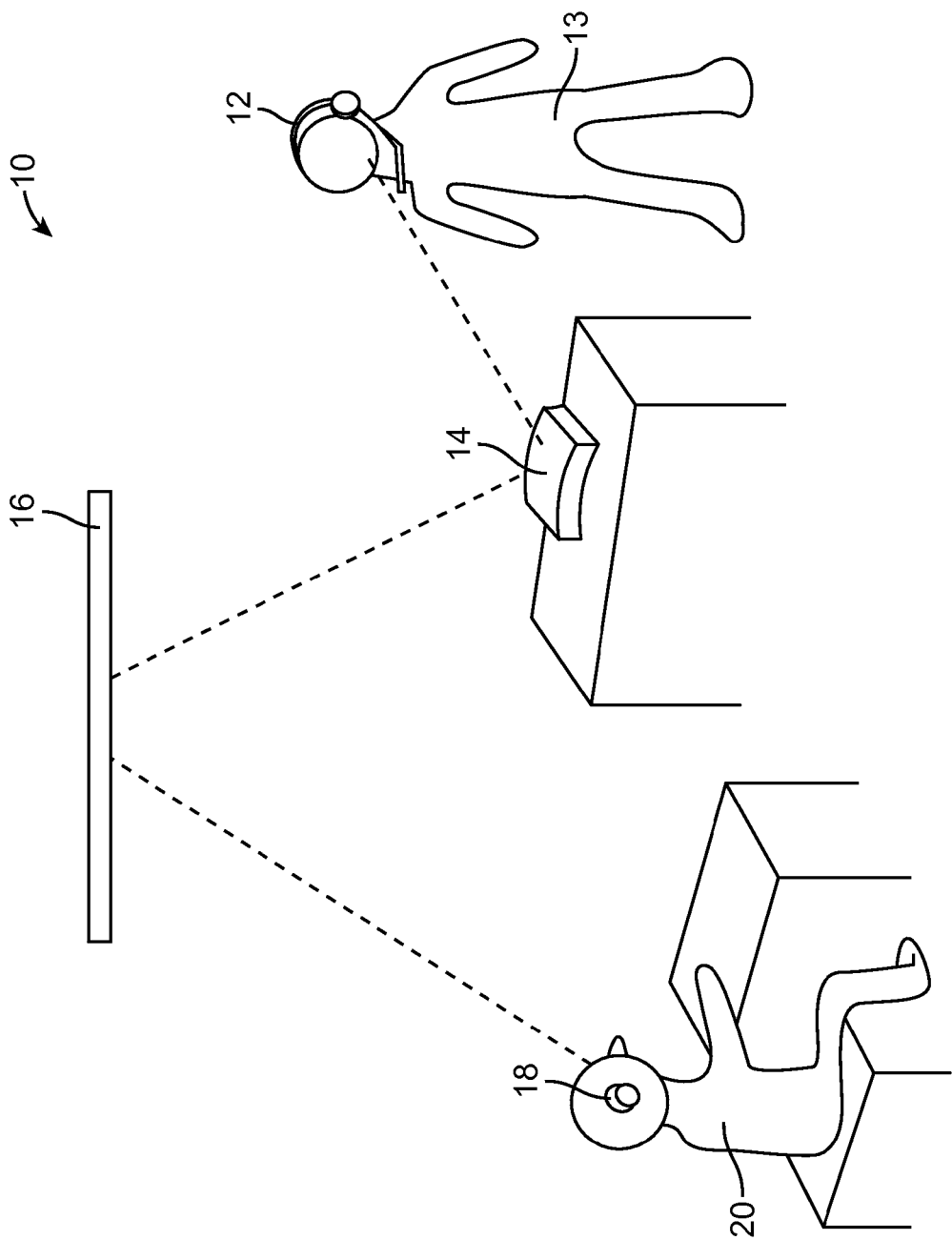
FIG. 1 illustrates a hearing system in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

FIG. 1 illustrates a hearing system 10 in accordance with some embodiments. The hearing system 10 includes a microphone 12 for wear by a first end user 13, a hub 14 communicatively coupled to the microphone 12, a light source 16 communicatively coupled to the hub 14, and a hearing device 18 configured to receive light signals from the light source 16. The hearing device 18 is configured for wear by a second user 20 of the hearing device 18. In some embodiments, the first end user 13 may be a teacher or a parent. Also, in some embodiments, the second end user 20 may be a student or a child.

During use of the hearing system 10, the first end user 13 (who may be a parent or a teacher) communicates with the second end user 20 (who may be a child or a student) through the devices 12, 14, 16, 18. In particular, voice from the person 13 is received by the microphone 12, which then transmits sound signals to the hub 14. The hub 14, in response to receiving the sound signals from the microphone 12, transmits corresponding signals to the light source 16. The light source 16 then generates corresponding light signals in response to the signals received from the hub 14. The light signals are received by the hearing device 18, which converts the light signals into corresponding sound signals so that the second end user 20 can hear the sound signals. In other embodiments, the hub 14 may be configured to transmit the sound signals using radiofrequency to the device 18. In such cases, the light source 16 may be reserved for communicating non-sound signals (e.g., control signals) to the device 18. Regardless of whether sound signals are transmitted optically or using radiofrequency, by transmitting the first end user's 13 speech from the hub 14 to the hearing device 18, the second user 20 may hear the first end user's 13 words directly in his/her ear(s), without any distracting background noise. For example, children with hearing loss or attention-related problem may find group activities and meal times challenging because of the complex mix of chatter, table banging, clinking of utensils and glasses, and background noise. By removing or reducing this distracting noise, the second end user 20 may identify and respond to what is being said.

In other embodiments, in addition to communicating sound signals from the person 13 to the person 20, the hearing system 10 may also be configured to allow the person 13 to control the hearing device 18 that is being worn by the person 20. For example, in some embodiments, the hub 14 may include one or more controls for allowing the person 13 to control the hearing device 18 (e.g., to activate the hearing device 18, to deactivate the hearing device 18, to setup the hearing device 18, to program the hearing device 18, to operate the hearing device 18 (such as to change a gain—e.g., a volume, of an output), or any combination of the foregoing). In such cases, when a command is received at the hub 14, the hub 14 then generates a corresponding control signal for reception by the light source 16. The light source 16, in response to receiving the command signal from the hub 14, generates a corresponding light signal that represents the command. The device 18 receives the light signal from the light source 16 and operates in accordance with the command represented by the light signal.

In further embodiments, sound from the device 12 may be communicated to the device 18 using non-optical device(s), such as a radiofrequency transceiver, while control signals from the hub 14 may be communicated to the device 18 using the light source 16. In some embodiments, the hub 14 may include a radiofrequency transceiver for communicating sound between the devices 12, 18, and for communicating control signals to the light source 16. In other embodiments, a separate wireless device may be used to communicate sound between devices 12, 18, while the hub 14 may be dedicated for communicating control signals to the device 18 through the light source 16. In further embodiments, the respective functions of the separate wireless device and the hub 14 may be reversed. For example, in other embodiments, the hub 14 may be dedicated for transmitting audio signals, while the separate wireless device may be used to communicate the control signals for controlling the device 18.

Figure 2:
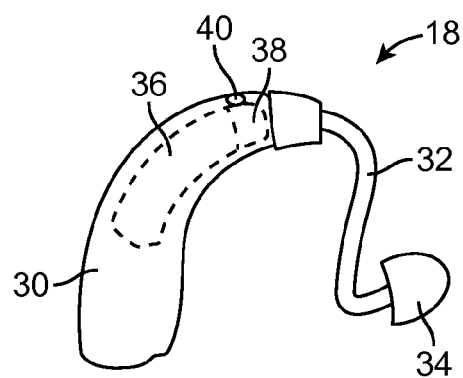
FIG. 2 illustrates a hearing device in accordance with some embodiments.

FIG. 2 illustrates an example of the hearing device 18 in accordance with some embodiments. The hearing device 18 includes a housing 30, a flexible elongate member 32 coupled to the housing 30, and an earpiece 34 coupled to an end of the elongate member 32. The hearing device 18 also includes an integrated circuit 36, a speaker 38, and an optical receiver 40. The optical receiver 40 is configured to detect light signals from the light source 16, and provide electrical signals in response to the detected light signals. In some embodiments, the integrated circuit 36 is configured to receive the electrical signals, and process the electrical signals for output to the speaker 38.

In some embodiments, the integrated circuit 36 may be configured (e.g., built and/or programmed) to provide processed signals (e.g., to prevent feedback, eliminate or reduce background noise, provide directionality, enhance speech by the first end user 13, etc.) so that the person 20 can hear and/or understand better the words of the first end user 13. In some embodiments the integrated circuit 36 may be configured to lessen tinnitus or the effects of occlusion for the second end user 20. In some embodiments the integrated circuit 36 may be configured to provide ear-to-ear signal processing. In other embodiments, the integrated circuit 36 may be configured to provide a combination of the features described. In further embodiments, instead of, or in addition to, including one or more of the above features, the integrated circuit 36 may include specific algorithm for compensating hearing deficiency that is specific for each individual. The integrated circuit 36 may be implemented as a processor (e.g., a signal processor) in some embodiments.

The speaker 38 is configured to generate audio signals based at least in part on the electrical signals. In the illustrated embodiments, the speaker 38 is located inside the housing 30, and the elongate member 32 is a hollow tube configured to transmit acoustic signals from the speaker 38 to the earpiece 34. In other embodiments, the speaker 38 may be located inside the earpiece 34. In such cases, the elongate member 32 may include an electrical conductor for transmitting electrical signals from the integrated circuit 36 to the speaker 38 in the earpiece 34.

In other embodiments, in addition to, or instead of, providing electrical signals for output to the speaker 38, the integrated circuit 36 may be configured to use the electrical signals for controlling an operation of the device 18. By means of non-limiting examples, the integrated circuit 36 may be configured to use the electrical signal(s) for activating the device 18, deactivating the device 18, setting up the device 18, programming the device 18, operating the device 18 (e.g., changing a gain—e.g., a volume, of the audio signals provided by the device 18), or any combination of the foregoing.

In other embodiments, the device 18 may optionally further include a radiofrequency receiver for receiving radiofrequency signals that represent sound. In such cases, the radiofrequency receiver may be coupled to the speaker 38, and generates output for the speaker 38 based on radio frequency signals received by the receiver. The speaker 38 then generates audio signals in response to the output provided by the radiofrequency receiver. Such configuration is advantageous in that it allows sound be transmitted to the device 18 using radiofrequency signals, while the optical device 14 is reserved for receiving non-sound signals (e.g., control signals for controlling operations of the device 18).

The optical receiver 40 may be any device that is capable of detecting light. In one implementation, the optical receiver 40 may include one or more photodetectors. In the illustrated embodiments the optical receiver 40 is located at a top side of the housing 30. The housing 30 is a behind-the-ear unit that is configured for placement behind an ear of the user 20 during use. When the second end user 20 is wearing the hearing device 18 with the housing 30 behind the ear, the optical receiver 40 is facing a ceiling of a room where the light source 16 is located. Thus, the position of the optical receiver 40 at the hearing device 18 allows the optical receiver 40 to effectively detect light signals from the light source 16.

Figure 3:
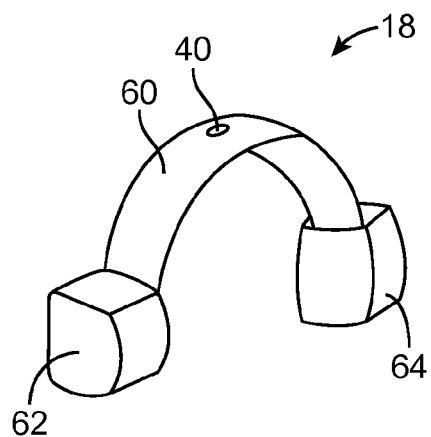
FIG. 3 illustrates a hearing device in accordance with other embodiments.

It should be noted that the hearing device 18 is not limited to the configuration described in the previous example, and that the hearing device 18 may have other configurations in other embodiments. For example, in other embodiments, the hearing device 18 may be a headset having a headband 60, a left speaker 62 at one end of the headband 60, and a right speaker 64 at the other end of the headband 60 (FIG. 3). The optical receiver 40 may be located at the top side of the headband 60 so that when the second user 20 wears the hearing device 18, the optical receiver 40 can effectively detect light signals from the light source 16 at the ceiling. In other embodiments, the hearing device 18 may not include one of the speakers 62, 64.

Figure 4:
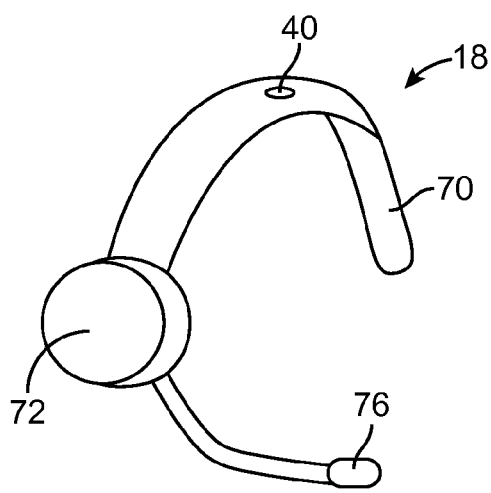
FIG. 4 illustrates a hearing device in accordance with other embodiments.

In still other embodiments, the hearing device 18 may include a microphone for allowing the second user 20 of the hearing device 18 to communicate to other person(s). For example, as shown in FIG. 4, in other embodiments, the hearing device 18 may be a headset having a headband 70, a speaker 62 at one end of the headband 70, and a microphone 76. The optical receiver 40 may be located at the top side of the headband 70 so that when the second end user 20 wears the hearing device 18, the optical receiver 40 can effectively detect light signals from the light source 16 at the ceiling. In other embodiments, the hearing device 18 may optionally further include a second speaker at the other end of the headband 70. The microphone 76 allows the second end user 20 of the hearing device 18 to communicate to the first end user 13 using the device 12 (or to another person using another hearing device). In such cases, the hearing device 18 also includes a transmitter coupled to the integrated circuit 36 in the hearing device 18. The integrated circuit 36 processes signals received from the microphone 76, and transmits the processed signals to the transmitter for transmission of the signals. In some embodiments, the device 12 may include a receiver, in which cases, the signals may be transmitted directly from the hearing device 18 to the device 12 through a wireless communication path (e.g., radiofrequency channel, Bluetooth, etc.). In other embodiments, the hub 14 may include a receiver. In such cases, the signals from the hearing device 18 may be transmitted for reception by the hub 14 through a wireless communication path (e.g., radiofrequency channel, Bluetooth, etc.). The hub 14 then transmits the signals to the device 12 through a wireless communication path (e.g., radiofrequency channel, Bluetooth, etc.). In other embodiments, one or more of the wireless communication paths (e.g., the path between the hearing device 18 and the hub 14, the path between the hub 14 and the device 12, the path between the hearing device 18 and the device 12, etc.) may be implemented optically. In one implementation, signals from the hearing device 18 are transmitted to the hub 14 using a radiofrequency channel. The hub 14 then transmits the signals to the light source 16 (e.g., through a radiofrequency channel or through an electrical conductor), which generates light signals in response to the signals received from the hub 14. In such cases, the device 12 may include its own optical receiver, which is configured to detect light signals from the light source 16. The optical receiver of the device 12 detects the light signals from the light source 16, and generates electrical signals in response to the light signals. An integrated circuit in the device 12 then processes the electrical signals, and a speaker at the device 12 outputs audio signals for hear by the person 13 based on the processed electrical signals. In other embodiments, the microphone 76 may allow multiple second end users 20 to communicate with each other. For example, in other embodiments, the system 10 may include multiple devices 18 that are worn by respective second end users 20. In such cases, the users 20 may communicate with each other through the microphones 76 of the respective devices 18. Any of the communication schemes described herein for communicating between the users 13, 20 may be used to implement communication among users 20. It should be noted that the microphone 76 is not limited to the example of configuration shown, and that the microphone 76 may have different configurations in different embodiments. For example, in other embodiments, the microphone 76 may be located within a housing of the hearing aid device 18. In other embodiments, the microphone 76 may be an external microphone that is separately worn by the second end user 20.

Figure 5:
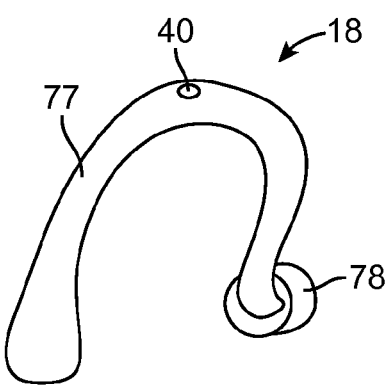
FIG. 5 illustrates a hearing device in accordance with other embodiments.

In other embodiments, the hearing device 18 may include an ear hook 77 for placement around an ear of the user 20 (FIG. 5). In such cases, the optical receiver 40 may be located at the top of the ear hook 77 so that it can detect light signals from the light source 16 at the ceiling. The device 18 also includes an ear piece 78 for placement in the ear canal. Other components, such as those described with the embodiments of FIG. 2 (e.g., the integrated circuit 36, speaker 38, etc.) may be included in the ear hook 77 and/or the ear piece 78.

In the above embodiments, the optical receiver 40 is located at the hearing device 18. In other embodiments, the optical receiver 40 may be located away from the hearing device 18. For example, as shown in FIG. 6, in other embodiments, the optical receiver 40 may be located at a device 80 that is separate from the hearing device 18. The device 80 includes an integrated circuit 82 coupled to the optical receiver 40, and a signal transmitter 84. During use, the optical receiver 40 is configured to detect light signals (which may represent sound and/or control command) from the light source 16, and provide electrical signals in response to the detected light signals. The integrated circuit 82 is configured to receive the electrical signals, and process the electrical signals for output to the transmitter 84. The transmitter 84 is configured to transmit the output from the integrated circuit 82 for reception by the hearing device 18. The hearing device 18 includes a signal receiver 86 configured to receive transmitted signals from the transmitter 84. In some embodiments, the device 18 generates audio signals based at least in part on the signals received from the transmitter 84. In other embodiments, the signals received from the transmitter 84 are for controlling the device 18. In some embodiments, the signals may be transmitted from the transmitter 84 to the receiver 86 at the hearing device 18 through a wireless communication path (e.g., radiofrequency channel, Bluetooth, etc.). In other embodiments, the signals may be transmitted from the transmitter 84 to the receiver 86 at the hearing device 18 through a cable (e.g., an electrical conductor). Also, in some embodiments, the device 80 may have a base configured for allowing the device 80 to be placed on a surface, such as a table. In other embodiments, the device 80 may be configured for wear by the user of the hearing device 18. For examples, in other embodiments, the device 80 may have a wrist band for allowing the user 20 to wear the device 80 on a wrist, a neck band for allowing the second end user 20 to wear the device 80 at the neck, or a harness for allowing the second end user 20 to wear the device 80 at the body, etc. In some embodiments, the device 80 itself may be considered to be a part of the hearing device 18.

In other embodiments, the hearing device 18 may include a plurality of optical receivers 40. For example, as shown in FIG. 7, the hearing device 18 may include a first optical receiver 40a at the top of the hearing device 18, and a second optical receiver 40b at the side of the hearing device 18. Such configuration allows the hearing device 18 to detect light signals from at least two directions. In other embodiments, the hearing device 18 may include more than two optical receivers 40. Also, in other embodiments, the hearing device 18 may include an optical receiver 40 at the front of the hearing device 18 facing a viewing direction of the second end user 20. Such configuration allows the optical receiver 40 to receive light signals from a light source that is in front of the second end user 20. In other embodiments, the hearing device 18 may include optical receiver(s) 40 located anywhere at the hearing device 18, as long as the optical receiver(s) 40 can detect light signals from a light source.

The hearing device 18 is not limited to the examples described previously, and may have other configurations in other embodiments. For example, in other embodiments, the hearing device 18 may be any device that is capable of providing sound for the second end user 20.

Referring now to FIG. 8, embodiments of the hub 14 will now be described. In the illustrated embodiments, the hub 14 includes a user interface 100 having a screen 102 for displaying information, and an input device 103 for entering information (e.g., command, data, program, etc.) to the hub 14. The input device 103 may include one or more buttons. In other embodiments, the input device 103 may include a pointer positioning device, such as a touch pad, or a trackball. In further embodiments, the screen 102 may be a touch screen. In such cases, the input device 103 may be implemented as a part of the screen 102. In other embodiments, the input device 103 may be any user interface device that allows a user to input information (e.g., command). As shown in the figure, the hub 14 also includes a non-transitory medium 104 for storing data (such as information received through the input device 103), an integrated circuit 106 for processing information, a receiver 108 for receiving signals, and an output port 110 for outputting processed information from the integrated circuit 106. In some embodiments, the receiver 108 of the hub 14 is configured for receiving signals wirelessly (e.g., through a radiofrequency channel, Bluetooth, etc.) from a signal source, such as the device 12 worn by the first end user 13. In other embodiments, the receiver 108 of the hub 14 may be coupled to a signal source (e.g., the device 12) through a cable (e.g., an electrical conductor). Also, in the illustrated embodiments, the output port 110 of the hub 14 allows the hub 14 to be connected to the light source 16 through a cable 112 (e.g., an electrical conductor). In other embodiments, the hub 14 may be configured to communicate with the light source 16 wirelessly. In such cases, the hub 14 may further include a transmitter coupled to the integrated circuit 106, wherein the transmitter is configured to transmit signals from the integrated circuit 106 to the light source 16 wirelessly.

In some embodiments, the hub 14 allows the first end user 13 to selectively choose which person(s) 20 to communicate to. For example, the hub 14 may be configured to provide different users' 20 names at the screen 102. The user 13 may then select one of the users 20 using the input device 103. After the user 20 has been selected at the hub 14, the hub 14 then transmits a control signal to the light source 16. The light source 16 receives the control signal from the hub 14, and generates light signal in response to the control signal. In other embodiments, the hub 14 may be configured to allow a selection of a plurality of second devices 18. For example, in other embodiments, a mapping list may be created and stored in the hub 14 (e.g., in a non-transitory medium in the hub 14), wherein the mapping list includes identifications of the second devices 18 and the respective names of the second end users 20 for the respective devices 18. During use, the identifications of the devices 18 and/or the names of the respective users 20 of the second devices 18 may be displayed on the screen of the hub 14.

In some embodiments, the light signal represents an identification of a certain hearing device 18. In such cases, if there are multiple different hearing devices 18 with different respective identifications, all of the hearing devices 18 may detect the light signal. Each device 18 then compares the identification represented by the light signal with an identification that is stored in a non-transitory medium in the device 18. In the illustrated example, because the light signal represents an identification of a certain device 18, when that device 18 receives the light signal, it will know that it is being communicated by the light source 16. When the other device(s) 18 receives the same light signal, the identification represented by the light signal will not match the identification stored in the device(s) 18, and it will then know that it is not being communicated by the light source 16.

In some embodiments, after a certain device 18 has been informed that it is being communicated by the light source 16, the device 18 is then configured to receive a following command signal from the light source 16. Thus, in some embodiments, the light source 16 may be configured to provide light signals having the format: (Device identification, command). The command may be a command to activate the device, to deactivate the device, to setup the device, to program the device, to control the device (such as to adjust a gain—e.g., a volume), etc. For example, for volume adjustment, the light signal may have the format (Device identification, Volume level). In such cases, when the device 18 with identification, e.g., 1234, receives light signal that represents (Device identification=1234, Volume level=3), the device 18 then adjusts its volume level to level 3 based on the received light signals.

In other embodiments, the hub 14 may allow the first end user 13 to select multiple persons 20 to communicate to, or to select all available persons 20 to communicate to. In further embodiments, the hub 14 may allow the first end user 13 to deactivate all of the hearing devices 18 so that they do not receive any light signals and/or do not produce any audio signals. In still further embodiments, the hub 14 may allow the first end user 13 to control one or more hearing devices 18, such as to adjust a gain of a particular device 18.

Any of the above features may be implemented by providing graphics at the screen 102 of the hub 14, and allowing the user 13 to choose certain function using the input device 103. For example, the screen 102 of the hub 14 may provide a graphic for gain adjustment. In such cases, the first end user 13 may select the graphic for adjusting the gain—e.g., a volume, of a particular hearing device 18 using the input device 103. In another example, the integrated circuit 106 may retrieve names of users 20 of the hearing devices 18 from the medium 104, and display them on the screen 102. The user 13 of the hub 14 may then select one or more persons 20 using the input device 103 to communicate to.

The integrated circuit 106 of the hub is configured to process command and/or instruction entered using the input device 103. For example, in some embodiments, the integrated circuit 106 may be configured to process the command by passing it downstream to the light source 16. By means of non-limiting examples, the command may be a command to activate a hearing device 18, a command to deactivate a hearing device 18, a command to setup a hearing device 18, a command to program a hearing device 18, or a command to control a function (e.g., gain) of a hearing device 18. In other embodiments, the integrated circuit 106 may be configured to process information entered using the input device 103, and passes it to the medium 104 for storage. By means of non-limiting examples, such information may be identifications of hearing devices 18, names of persons using the hearing devices 18, status (e.g., active or inactive) of each hearing device 18, program instructions for each hearing devices 18, profiles for different second end users 20 of hearing devices 18, etc. In some embodiments, a profile of the second end user 20 may include hearing preference, medical condition, type of hearing deficiency, etc.

Figure 9:
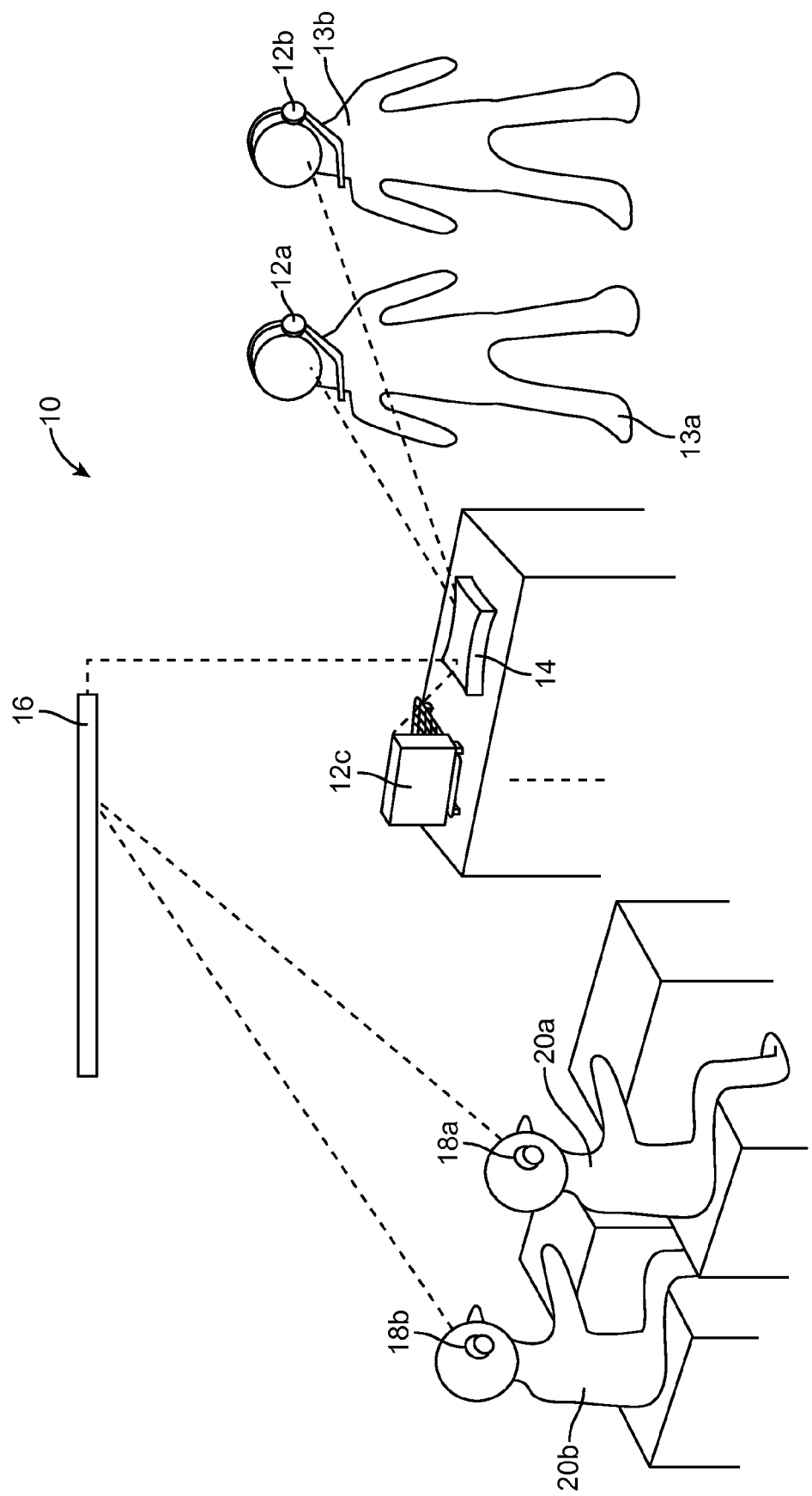
FIG. 9 illustrates a hearing system in accordance with other embodiments.

In further embodiments, the hub 14 may be configured to allow multiple persons 13 to communicate to one or multiple persons 20 (FIG. 9). As shown in the figure, the hearing system 10 may include multiple devices 12a, 12b worn by multiple persons 13a, 13b, and multiple hearing devices 18a, 18b, worn by multiple persons 20a, 20b. In such cases, the hub 14 may be selectively configured to allow multiple persons 13a, 13b (sound sources) to communicate to one or more persons 20a, 20b using the devices 12a, 12b, 18a, 18b. In some embodiments, a user of the hub 14 may enter the identifications of the devices 12a, 12b, and user names, into the medium 104 of the hub 14 using the user interface 100. During use, the identifications of the devices 12a, 12b and/or the names of the users 13a, 13b may be retrieved from the medium 104 for display on the screen 102, and the user may then select certain one(s) of the devices 12 to be active to thereby allow the selected device(s) 12 to communicate with certain user(s) 20 of the hearing device(s) 18.

In further embodiments, the hub 14 may also be configured to receive data from a device 12c (e.g., wirelessly or through a cable), and transmit the data to the light source 16. The light source 16 then generates light signals in response to a reception of the data, wherein the light signals represent the data transmitted from the hub 14. The light signals are then detected by the optical receiver on the device 18. By means of non-limiting examples, the device 12c may be a computer, a television, a radio, a music player, a game device, etc. Also, the data transmitted from the device 12c may be sound signals in some embodiments. In other embodiments, the data transmitted from the device 12c may be a control signal configured to control the device 18 (e.g., to control a gain, a state, etc., of the device 18). In further embodiments, the hub 14 may be configured to receive signals from multiple electronic devices, such as a computer and a music player. In such cases, the hub 14 may be implemented using a streamer that is configured to stream signals from different electronic devices to the hearing device(s) 18.

When there are multiple signal sources 12, various signal transmission schemes may be used by the hub 14 to transmit signals from the different sources 12. In some embodiments, the hub 14 may be configured to transmit signals from different sources 12 by allocating certain time slots for each of the signal sources 12. In such cases, the light source 16 may be configured to receive signals from the hub 14 at the respective time slots for each of the signal sources 12. The light source 16 may also be configured to provide light signals by allocating certain time slots for transmitting the light sources for each of the signal sources 12. In other embodiments, the hub 14 may be configured to transmit signals from different sources 12 to the light source 16 by using different frequencies. In such cases, the light source 16 may be configured to receive signals from different sources 12 at different frequencies, and then transmit corresponding light signals in response there to. In some embodiments, the light source 16 may be configured to provide light signals by allocating certain time slots for transmitting the light sources for each of the signal sources 12. Any of the signal transmission schemes known in the art may, such as time-division, frequency division, etc., be used by the hub 14 and/or the light source 16 to transmit signals. In further embodiments, the light source 16 may be configured to provide light signals in different ranges of wavelength for communicating with different respective devices 18. For example, in other embodiments, the light source 16 may be configured to provide light signals with different respective colors. In such cases, a first device 18 may be configured to detect light signals in a first color, and a second device 18 may be configured to detect light signals in a second color that is different from the first color. In further embodiments, the same device 18 may be configured to detect light signals in different colors. In such cases, a signal in a first color may be configured to control a first function of the device 18, and a signal in a second color different from the first color may be configured to control a second function of the device 18.

Figure 10:
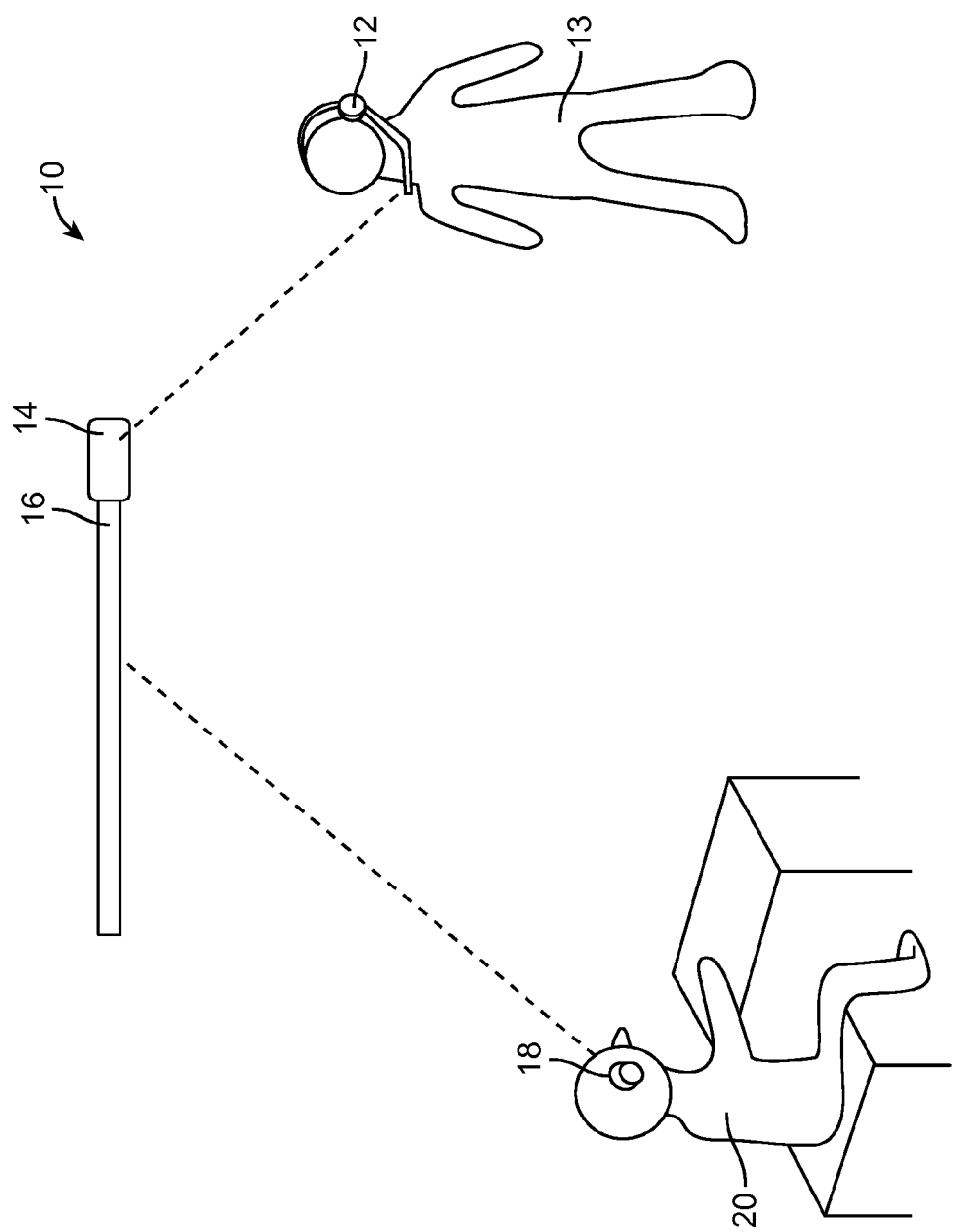
FIG. 10 illustrates a hearing system in accordance with other embodiments.

In the above embodiments, the hub 14 has been illustrated as being a unit that is placed on a support, such as a table. However, in other embodiments, the hub 14 may be located at other positions. For example, as shown in FIG. 10, in other embodiments, the hub 14 may be secured to the light source 16, or be implemented as a part of the light source 16. Also, in other embodiments, the hub 14 may be mounted to a wall, to a ceiling, or to any location within a room.

Figure 11:
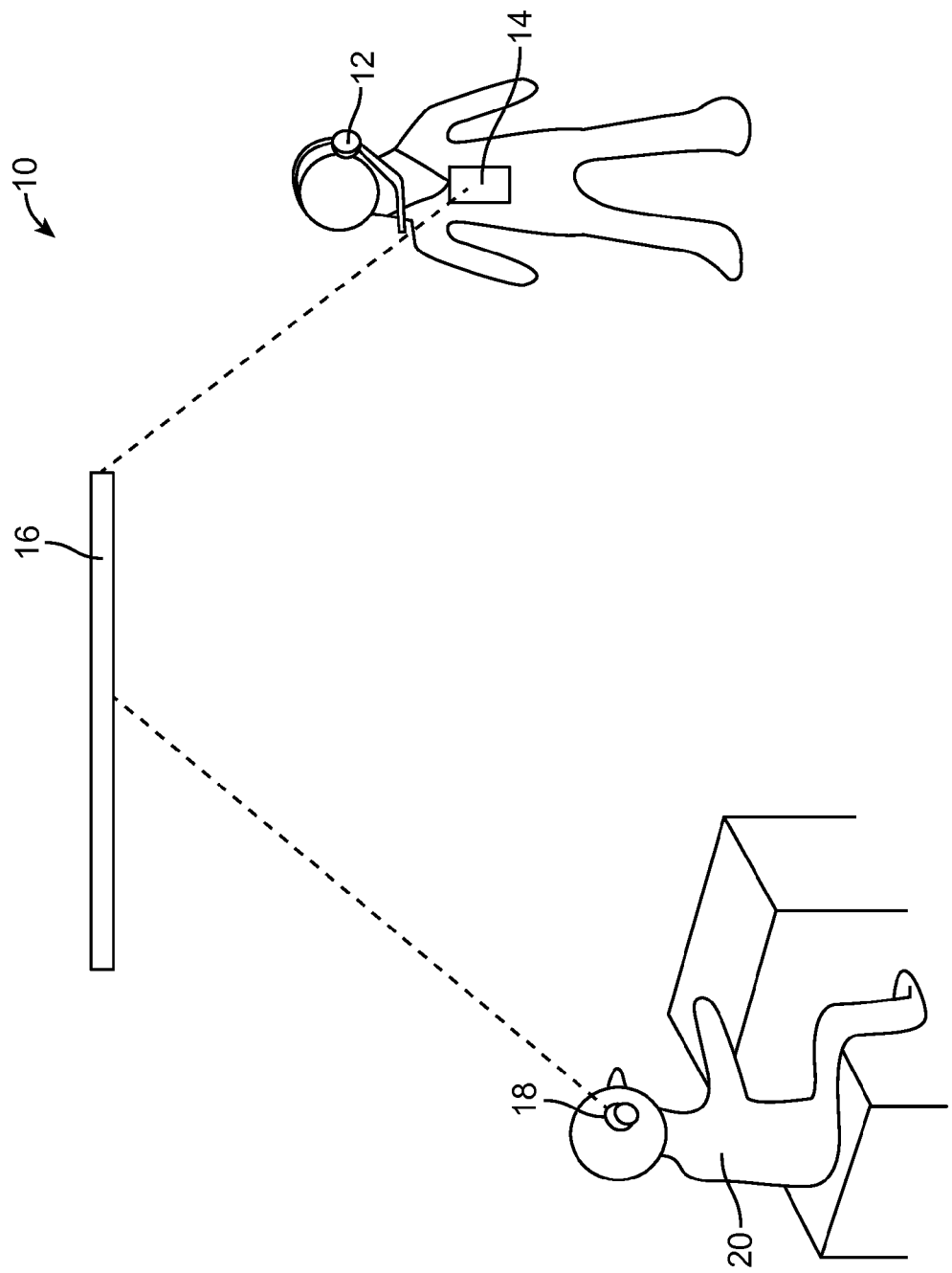
FIG. 11 illustrates a hearing system in accordance with other embodiments.

Also, in other embodiments, the hub 14 may be configured to be worn by the user 12. For example, as shown in FIG. 11, the hub 14 may include a strap/neck band for allowing the user 12 wear the hub 14 around the neck. In other embodiments, the hub 14 may have a wrist band for allowing the user 12 to wear the hub 14 on a wrist, or a harness for allowing the user 20 to wear the device 80 at the body, etc. In further embodiments, the hub 14 may be implemented as a component of the device 12.

Figure 12:
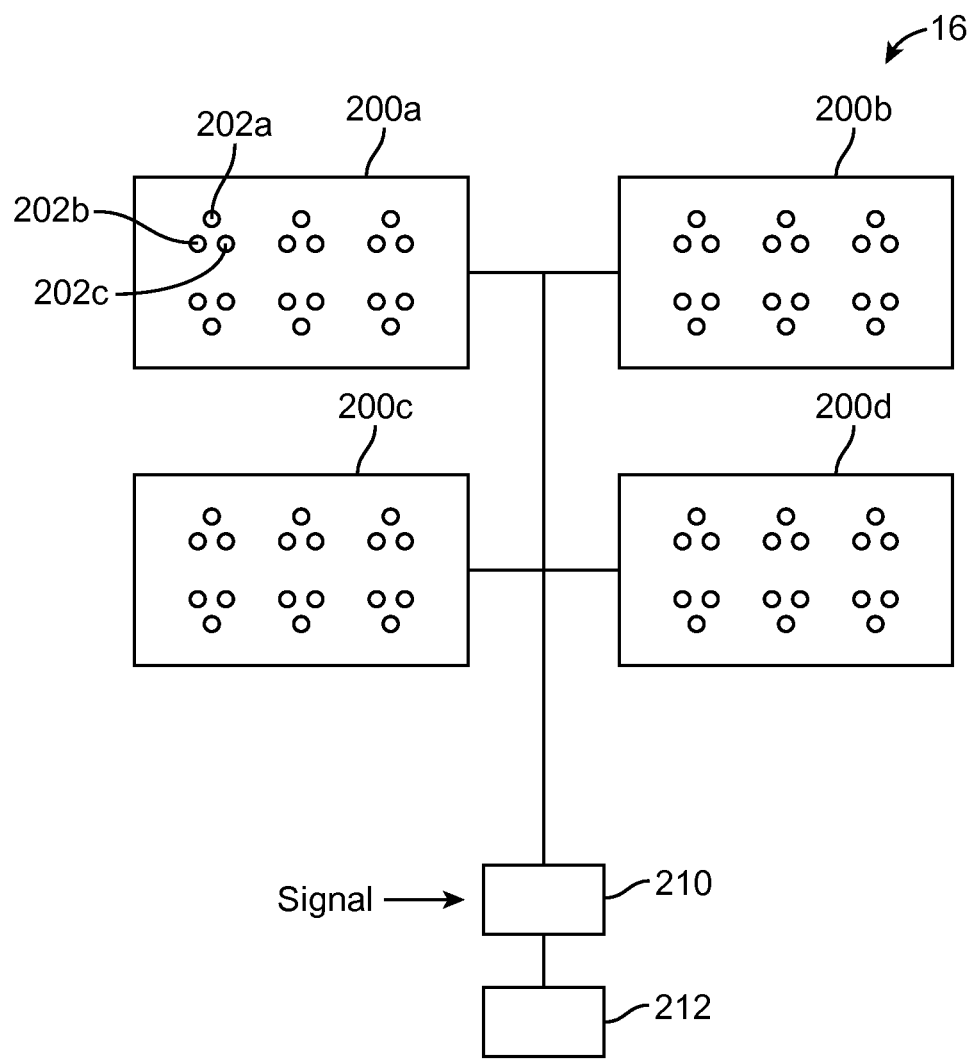
FIG. 12 illustrates a light source in accordance with some embodiments.

FIG. 12 illustrates the light source 16 in accordance with some embodiments. In the illustrated embodiments, the light source 16 includes four light panels 200a-200d. In other embodiments, the light source 16 may include less than four light panels 200 (e.g., one light panel), or more than four light panels 200. The light panels 200 may be placed anywhere in a room (e.g., at the ceiling, on wall(s), etc.). Each light panel 200 includes a plurality of light emitting diodes (LED) 202 configured to provide light signals for reception by the device(s) 18. In the illustrated embodiments, the LEDs 202 are organized into group of three, which each group having a first LED 202a for providing red light (e.g., approximately 650 nanometer wavelength), a second LED 202b for providing blue light (e.g., approximately 475 nanometer wavelength), and a third LED 202c for providing green light (e.g., approximately 565 nanometer wavelength). In the illustrated embodiments, the LEDs 202a-202c in each group are shown as discrete components. In other embodiments, the LEDs 202a-202c in each group may be integrated onto a common die to form a single LED. In some embodiments, different colors may be produced by the LEDs 202a-202c by controlling the relative power applied to each of the LEDs 202a-202c.

In the illustrated embodiments, the light source 16 also includes a control unit 210 for receiving signals (e.g., voice signals, control signals, etc.), and pulsing the LEDs 202 to generate corresponding light signals. In some embodiments, the light signals may be transmitted at a transmission rate that is not discernable by human eye (e.g., at rate(s) higher than that detectable by human eye). Also, in some embodiments, the control unit 210 is configured to couple to a power source 212, which provides AC or DC power for operating the control unit 210. The control unit 210 may be configured to transmit the signals over a power line to thereby drive the LEDs 202 to emit corresponding light signals. In one implementation, the control unit 210 may be a broadband-over-power-line (BPL) integrator. In other embodiments, the control unit 210 may be configured to transmit the signals to drive the LEDs 202 using a data line that is separate from the power line. Also, in other embodiments, the light source 16 may be coupled to a computer (or any of other electronic devices) that provides power for the light source 16. In such cases, the computer (or any of other electronic devices) may be considered the power source 212.

In other embodiments, instead of providing three colored LEDs 202a-202c, the light source 16 may include one or two of the three LEDs 202a-202c. Also, in other embodiments, the light source 16 may be configured to provide light signals at certain frequency ranges. For example, in some embodiments, the light source 16 may be configured to provide light signals at a certain color. In such cases, the LEDs 202 may be powered in such a way so that they emit light signals at a certain color. In other embodiments, in addition to, or in the alternative to, providing desired power to the LEDs 202, the light source 16 may include a filter to filter the light signals so that light signals with certain desired characteristics (e.g., color) are transmitted to the device(s) 18. Also, in other embodiments, instead of, or in addition to, providing a filter at the light source 16, the device(s) 18 may include a filter for filtering light signals received from the light source 16, to obtain light signals with certain desired characteristics (e.g., color). In further embodiments, the current and/or intensity for the LEDs 202 may be adjusted to provide optical signals with different respective characteristics. For example, intensity contrasts may be utilized to provide different light signals.

It should be noted that the light source 16 is not limited to the examples described previously, and that the light source 16 may have other configurations in other embodiments. For example, in other embodiments, the light source 16 may be secured to other locations (such as a wall) besides the ceiling. In further embodiments, the light source 16 may not be secured to a room. For example, in other embodiments, the light source 16 may be implemented on a device that is for wear by the user 13. Such a device may be a hat, a head band, a harness, etc. Also, in other embodiments, the device 12 itself may include the light source 16. One benefit of implementing the light source at a device that is worn by the user 13 is that the user 13 may selectively choose which device 18 to communicate to by positioning his/her body part to aim the light source 16 towards the particular device 18. In still further embodiments, the light source 16 may be implemented at the hub 14.

Figure 13:
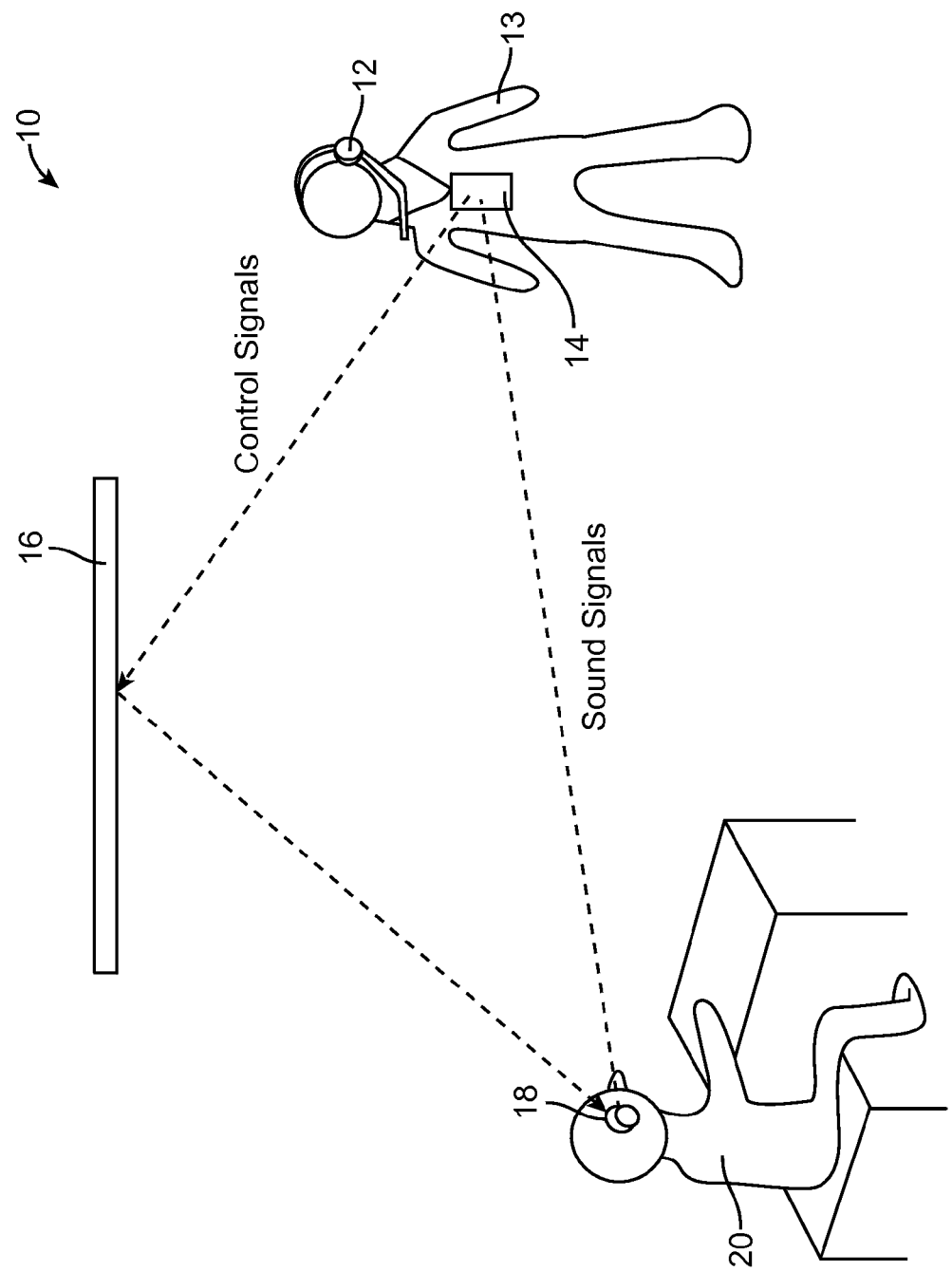
FIG. 13 illustrates a hearing system in accordance with other embodiments.

In some of the above embodiments, the system 10 has been described as being configured to transmit sound signals and/or control signals (signals for controlling an operation of the device(s) 18, such as to set up the device(s) 18, change a state of the device 18, activate a function (e.g., gain level) of the device 18, etc.) using the light source 16. In other embodiments, the light source 16 is configured to provide light signals that represent control signals, and not sound signals. In such cases, the light source 16 is dedicated for use to provide control signals to control an operation of the device(s) 18, and sound signals may be communicated from the person(s) 12 to the person(s) 20 without using the light source 16. For example, sound signals may be transmitted directly from the device 12 to the device 18 using non-optical devices (e.g., radiofrequency transceiver) (FIG. 13). In other embodiments, the sound signals may be transmitted from the device 12 to the device 18 through one or more intermediary communication device (e.g., a radiofrequency transceiver).

Also, in other embodiments, any of the features described with reference to the integrated circuit 36 of the hearing device 18 may be at least in part or completely implemented using the integrated circuit 106 of the hub 14, and/or an integrated circuit in the device 12. For example, in other embodiments, background noise reduction in sound signals may be implemented using one or a combination of the devices 12, 14, 18.

As illustrated in the above embodiments, the hearing system 10 is advantageous in providing sound communication and/or control signal communication. In particular, in the embodiments in which the hearing system 10 is configured to provide control signals to the device(s) 18 optically, the device(s) 18 may receive the control signals without interfering with sound communication between the devices 12, 18. For example, in some embodiments, the sound communication between the devices 12, 18 may be accomplished using radiofrequency, and the transmission of control signals using the light source 16 will not interfere with the radiofrequency transmission of sound signals (e.g., the optical communication will not cause any interference with the radiofrequency transmission). Also, in the embodiments in which the hearing system 10 is configured to provide sound communication to the device(s) 18 optically, the hearing device(s) 18 may receive sound signals without any noise interference that may be associated with radiofrequency signal communication. Noise interference in radiofrequency communication may result in noisy audio output, which may be undesirable especially for user who may already have hearing deficiency. Using optical signals to communicate with the device(s) 18 may eliminate the interference problem associated with radiofrequency transmission. Furthermore, in some embodiments, using optical receiver to receive light signals may consume less energy than using a radiofrequency (RF) receiver to receive RF signals.

In the above embodiments, the system 10 has been described with reference to allowing the first end user 13 to control the device 18 worn by the second end user(s) 20. In other embodiments, the system 10 may be configured to allow a second end user 20 to control a gain for each first end user 13. For example, in other embodiments, when a second end user 20 wants to focus more on the first end user's 13 speech, the second end user 20 may decrease the gain (e.g., volume) from other users 20 (e.g., other students), and/or may increase the gain of the first end user 13 (e.g., a teacher) by entering an input at the hearing aid device 18. In such cases, the hearing aid device 18 may include a user interface (e.g., control buttons, display screen, touch screen, etc.) for allowing the second end user 20 to enter the input. In one implementation, after the device 18 receives the input from the second end user 20, the device 18 than executes a corresponding program stored in the device 18 that will cause a gain of the desired user(s) (e.g., first end user 13 and/or second end user(s) 20) to increase and/or a gain of the other user(s) to decrease.

In other embodiments, the system 10 may be implemented in a performance setting (e.g., a movie theater, performance art theater, etc.). In such cases, one or more hearing disabled persons wearing respective hearing devices 18 may receive the sound of the performance (e.g., movie) via light signals from the light source 16 at the ceiling and/or walls of the auditorium. Thus, the performance sound may be broadcast to one or more hearing disabled persons in the auditorium. In some embodiments, in order not to disturb other persons in the darkened performance setting, the wavelength of the light may be infrared (e.g., >800 nm) such that it is not seen by humans. The power of the infrared light may be below a prescribed limit to avoid damaging the human eye. In other embodiments, the light source 16 is configured to provide control signals to control the hearing device(s) 18 in the auditorium, while the sound of the performance is provided by to the hearing device(s) 18 by non-optical signals (e.g., by radio-frequency signals).

In further embodiments, the hearing device 18 may receive light signal(s) (e.g., infrared light signal(s)) from a light source when entering the performance setting, and the hearing device 18 then provides an audio signal to the hearing disabled person in response to the detected light signal(s) indicating to the hearing disabled person that the performance setting is equipped with such a system. The hearing device 18 may contain an input device (e.g., a switch) allowing the hearing disabled person to enable or disable reception of the light signals in the performance setting by the hearing device 18. In some embodiments, the hearing device 18 may deactivate the optical receiver in response to an input from the user 20 indicating that he/she wishes to disable reception of light signals in the performance setting. In one implementation, the input device may be implemented using the optical receiver of the hearing device 18. In such cases, when the user 20 cover up at least a portion of the optical receiver by his/her hand for a certain prescribed duration, the hearing device 18 then disables reception of light signals by the optical receiver.

In some embodiments, when the performance has ended, the system 10 may terminate transmission of the light signals. In other embodiments, when the hearing disabled person leaves the auditorium, the hearing aid 18 no longer receives light signals from the light source 16, and may stop the optical receiver in order to save energy.

In other embodiments, the light source 16 may be configured to transmit light signals to a specific area within a room so that only the person 20 with the hearing device 18 in that specific area can receive light signals from the light source 16. Such feature utilizes the directionality of light, which may be used to limit light transmission to certain area in a light-sealed space. In such cases, hearing device(s) 18 worn by others outside the specific area will not be able to detect the light signals from the light source 16. For example, such system 10 may be implemented in a bank in which confidential communication between a customer and a bank teller is required. In such cases, the light source 16 may be mounted on top of each teller counter at a bank, and is configured to transmit light signals in response to audio signal received from the bank clerk (an example of first end user 13) behind the counter. During use, when a customer (an example of second user 20) using the hearing device 18 stands in front of the counter, the hearing device 18 can automatically pick up the signal from the light source 16, and then provides the audio signal only to the customer 20 standing within the area covered (directed) by the light source 16.

Also, in one or more of the embodiments described herein, the system 10 may be implemented in any building structures, such as a house, a highrise, etc. In such cases, the building structure may include multiple light sources 16 located in the ceiling and/or the wall(s). For example, in some embodiments, there may be multiple light sources 16 located at a same wall, or at different walls. The light sources 16 may obtain power from any power source, such as solar panel(s).

Figure 14:
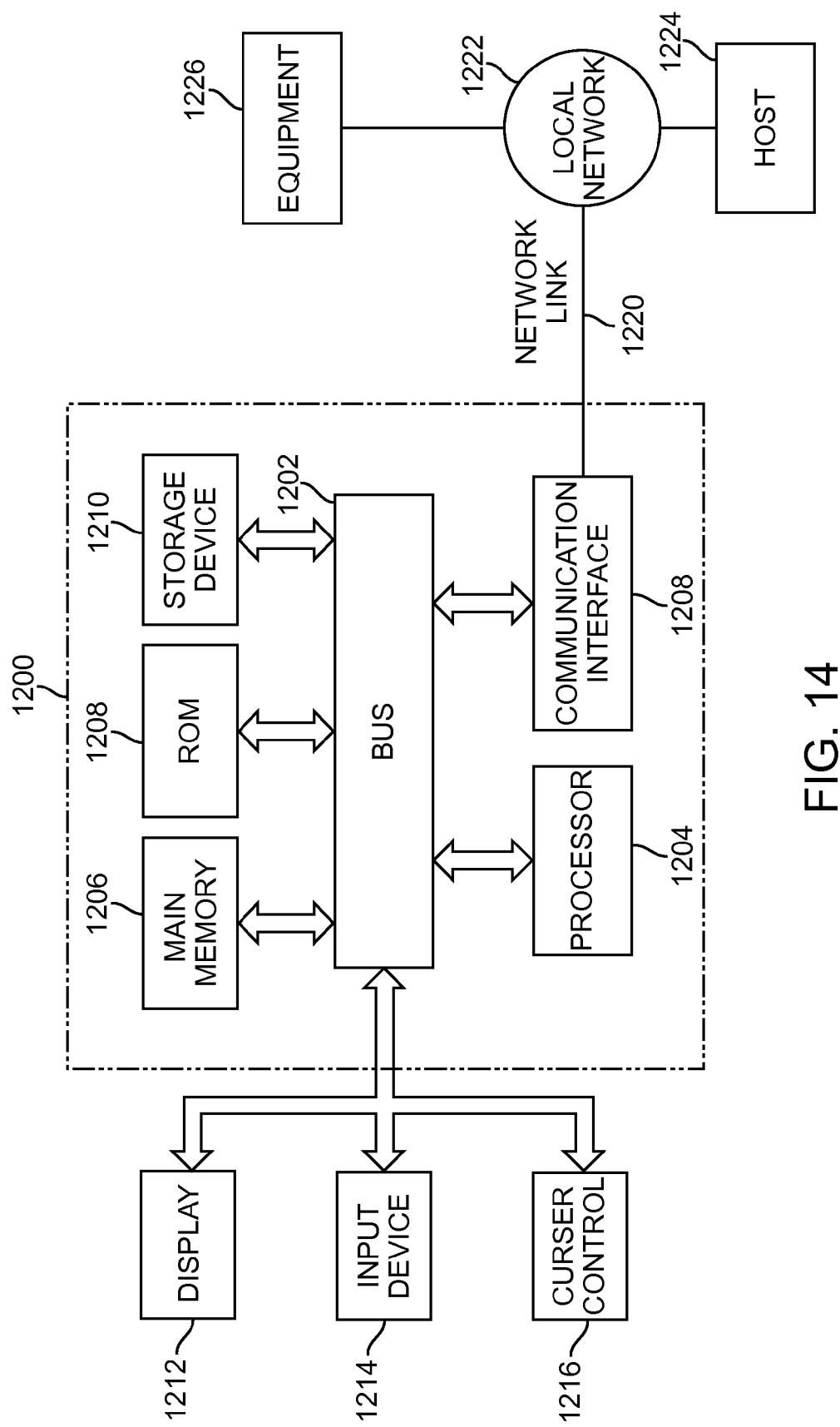
FIG. 14 illustrates a computer system that may be included in a hearing system in accordance with some embodiments.

FIG. 14 is a block diagram that illustrates an embodiment of a computer system 1200 upon which one or more components of the hearing system 10 may be implemented. In some embodiments, the computer system 1200 may be used to implement the hub 14. Computer system 1200 includes a bus 1202 or other communication mechanism for communicating information, and a processor 1204 coupled with the bus 1202 for processing information. The processor 1204 may be configured to perform various functions described herein. The computer system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The computer system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The computer system 1200 may be coupled via the bus 1202 to a display 1212, such as a cathode ray tube (CRT) or a flat panel, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The computer system 1200 may be used for performing various functions in accordance with the embodiments described herein. According to one embodiment, such use is provided by computer system 1200 in response to processor 1204 executing one or more sequences of one or more instructions contained in the main memory 1206. Such instructions may be read into the main memory 1206 from another computer-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement one or more embodiments described herein. Thus, one or more embodiments described herein are not limited to any specific combination of hardware circuitry and software.

The term "computer-readable medium" as used herein refers to any medium that participates in providing instructions to the processor 1204 for execution. Such a medium may take many forms, including but not limited to, non-volatile media, volatile media, and transmission media. Non-volatile media (an example of non-transitory media) includes, for example, optical or magnetic disks, such as the storage device 1210. Volatile media (another example of non-transitory media) includes dynamic memory, such as the main memory 1206. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the computer system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The computer system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the computer system 1200, are exemplary forms of carrier waves transporting the information. The computer system 1200 can send messages and receive data, including program code, through the network(s), the network link 1220, and the communication interface 1218.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed:

1. A hearing system, comprising:
a hearing device for wear by a user, the hearing device comprising a speaker; and
an optical receiver configured to detect light signals from a light source, and generate electrical signals in response to the detected light signals, the light source being on a structure that is spatially separated from the hearing device;
wherein the speaker of the hearing device is communicatively coupled to the optical receiver, and is configured to provide audio signals based at least in part on the electrical signals;
wherein the optical receiver is configured to detect the light signals at a transmission rate higher than that detectable by human eye; and
wherein the structure comprises a light fixture configured for mounting to a room.

2. The hearing system of claim 1, wherein the optical receiver comprises a photodetector.

3. The hearing system of claim 1, wherein the optical receiver is configured to be sensitive to light in a certain range of wavelengths.

4. The hearing system of claim 1, wherein hearing device comprises a housing, the speaker is inside the housing of the hearing device, and the hearing device further includes a sound tube for transmitting the audio signals from the speaker to an ear of the user.

5. The hearing system of claim 1, wherein the hearing device comprises a housing, the speaker is outside the housing of the hearing device, and the hearing device further includes a flexible electrical conductor coupled between the housing and the speaker.

6. The hearing system of claim 1, wherein the hearing device comprises a head band.

7. The hearing system of claim 6, wherein the optical receiver is located at the head band.

8. The hearing system of claim 1, wherein the optical receiver is a part of the hearing device.

9. The hearing system of claim 1, further comprising the light source for providing the light signals.

10. The hearing system of claim 9, wherein the light source comprises a plurality of LEDs.

11. The hearing system of claim 9, wherein the light source is configured to provide the light signals at the transmission rate higher than that detectable by human eye.

12. The hearing system of claim 9, further comprising a hub communicatively coupled to the light source.

13. The hearing system of claim 12, wherein the hub is configured to receive first signals associated with a first sound source.

14. The hearing system of claim 13, wherein the hub is further configured to receive second signals associated with a second sound source, and process the first signals and the second signals for transmission of the first and second signals to the light source in accordance with a predetermined transmission scheme.

15. The hearing system of claim 12, wherein the hub is configured for wear by a person.

16. The hearing system of claim 9, wherein the light source is configured to provide the light signals in a first color, and additional light signals in a second color for communication with an additional hearing device.

17. The hearing system of claim 1, further comprising:
the light source for providing the light signals; and a hub communicatively coupled to the light source;
wherein the hub includes a user interface for receiving an input, and wherein the light source is configured to provide the light signals based at least in part on the input; and
wherein the light source is configured to provide additional light signals for communication with an additional hearing device for an additional user.

18. The hearing system of claim 17, wherein the input is for activating a function in the hearing device, setting up the hearing device, programming the hearing device, controlling the hearing device, activating the hearing device, or deactivating the device.

19. The hearing system of claim 17, wherein the input is for controlling a gain of the audio signals provided by the hearing device.

20. The hearing system of claim 17, wherein the input comprises first signals associated with a first sound source, the first sound source being a user of the hub.

21. The hearing system of claim 20, wherein the hub is further configured to receive second signals associated with a second sound source, and process the first signals and the second signals for transmission of the first and second signals to the light source in accordance with a predetermined transmission scheme.

22. The hearing system of claim 17, wherein the hub is configured for wear by a user of the hub.

23. The hearing system of claim 17, further comprising a filter for filtering the light signals before they are detected by the optical receiver.

24. The hearing system of claim 17, wherein the light source is configured to provide the light signals in a first color, and additional light signals in a second color for communication with the additional hearing device.

25. The hearing system of claim 1, wherein the light signals are configured to activate a function in the hearing device, setup the hearing device, program the hearing device, control the hearing device, activate the hearing device, or deactivate the hearing device.

26. The hearing system of claim 1, wherein the optical receiver is located on top of the hearing device.

27. The hearing system of claim 1, further comprising a non-optical receiver, wherein the optical receiver is configured to detect the light signals as a control signal for controlling the hearing device, and the non-optical receiver is configured to receive sound signals.

28. The hearing system of claim 1, wherein the hearing device further comprises an integrated circuit configured to control a function of the hearing device based at least in part on the electrical signals.

29. The hearing system of claim 1, further comprising a filter for filtering the light signals before they are detected by the optical receiver.

30. The hearing system of claim 1, further comprising an additional hearing device for wear by an additional user, wherein the hearing device and the additional hearing device are configured for communication with a transmitter that includes a light source for providing the light signals.

31. The hearing system of claim 1, wherein the structure is spatially separated from the hearing device so that the hearing device is moveable relative to the structure during operation of the hearing device and the light source that is on the structure.

32. The hearing system of claim 1, wherein the light fixture is configured for mounting to a ceiling.

* * * * *